United States Patent [19]

Miller, III

[11] 4,315,105

[45] Feb. 9, 1982

[54] NARROW BAND TRANSMISSION SYSTEM AND METHOD

[76] Inventor: Herman P. Miller, III, P.O. Box 2163, Stockton, Calif. 95201

[21] Appl. No.: 744,305

[22] Filed: Nov. 23, 1976

[51] Int. Cl.³ .............................................. H04B 1/66
[52] U.S. Cl. ........................ 179/15.55 R; 179/15 BW
[58] Field of Search ............... 179/15.55 R, 15 BW, 179/107 FD, 1 SA

[56] References Cited

U.S. PATENT DOCUMENTS

| 1,836,824 | 12/1931 | Steinberg | 179/15.55 R |
| 1,948,973 | 2/1934 | Steinberg | 179/15.55 R |
| 2,014,081 | 9/1935 | Csepely | 179/15.55 R |
| 2,726,283 | 12/1955 | DiToro | 179/15.55 R |
| 3,069,506 | 12/1962 | Hopner | 179/15.55 R |

FOREIGN PATENT DOCUMENTS

| 724478 | 2/1955 | United Kingdom | 179/15.55 R |
| 828424 | 2/1960 | United Kingdom | 179/15.55 R |
| 1214597 | 2/1970 | United Kingdom | 179/15.55 R |
| 1518448 | 7/1978 | United Kingdom | 179/15.55 R |

*Primary Examiner*—Kathleen H. Claffy
*Assistant Examiner*—Kenneth A. Chayt
*Attorney, Agent, or Firm*—Flehr, Hohbach, Test, Albritton & Herbert

[57] ABSTRACT

System and method utilizing the temporal separation and amplitude differences of signals for transmitting the signals in a bandwidth corresponding to one half of the frequency range present in the signals.

15 Claims, 8 Drawing Figures

NARROW BAND TRANSMISSION SYSTEM AND METHOD

BACKGROUND OF THE INVENTION

This invention pertains generally to systems and methods for transmitting signals such as human speech and more particularly to a system and method for transmitting such signals in a bandwidth less than the frequency range found in the signals.

Cummunication systems such as telephone systems, radio systems and other systems for conveying intelligence commonly have only a limited bandwidth or frequency range available in which the signals can be transmitted. By reducing the bandwidth required to transmit individual signals, the number of signals which can be transmitted in a given bandwidth can be increased and interference between adjacent channels can be avoided.

In the past, it has been recognized that with signals having components occupying a range of frequencies, the different frequency components generally are not present simultaneously, but are separated temporally. The most significant portion of human speech, for example, generally falls within a range of about 200–3200 Hz, with the lower portion of this range (below 1600 Hz) being predominantly occupied by vowel sounds and the upper portion (above 1600 Hz) being occupied mainly by consonant sounds. These two classes of sounds generally do not occur simultaneously, and when a large amount of energy is present in one class, there will be very little energy in the other. Vowels sounds generally occur at a level on the order of 10–15 db higher than consonant sounds, although consonant sounds carry about 80% of the speech information content.

Heretofore, there have been attempts to utilize the temporal separation and amplitude differences of vowel and consonant sounds to permit time sharing transmission of the two classes of sound in the bandwidth normally occupied by one. Examples of such systems are found in U.S. Pat. Nos. 1,836,824 and 2,726,283. These systems have certain limitations and disadvantages such as high switching noise and synchronization problems which have made them unsuitable for commercial use.

SUMMARY AND OBJECTS OF THE INVENTION

The invention provides an asynchronous system and method for transmitting high and low frequency speech components in the bandwidth normally occupied by one component, without perceptible switching noise. At the transmitting station, one of the components is translated to the frequency range of the other, the translated signal is combined with the original components and the untranslated portion of the one component is removed to provide an output signal in which the translated component is present at a level substantially lower than the other component. At the receiving station, the translated component is identified by its lower level, and when the translated component is present, an injection signal is applied to a demodulator which restores that component to its original frequency range for recombination with the other component. The injection signal is applied gradually to prevent the generation of switching noise.

It is in general an object of the invention to provide a new and improved system and method for transmitting signals over a reduced bandwidth.

Another object of the invention is to provide a system and method of the above character which are particularly suitable for use with speech signals.

Another object of the invention is to provide a system and method of the above character which are substantially free of switching noise and are capable of asynchronous operation.

Additional objects and features will be apparent from the following description in which the preferred embodiments are set forth in detail in conjunction with the accompanying drawings.

DESCRIPTION OF THE PREFERRED EMBODIMENTS

Figure 1:
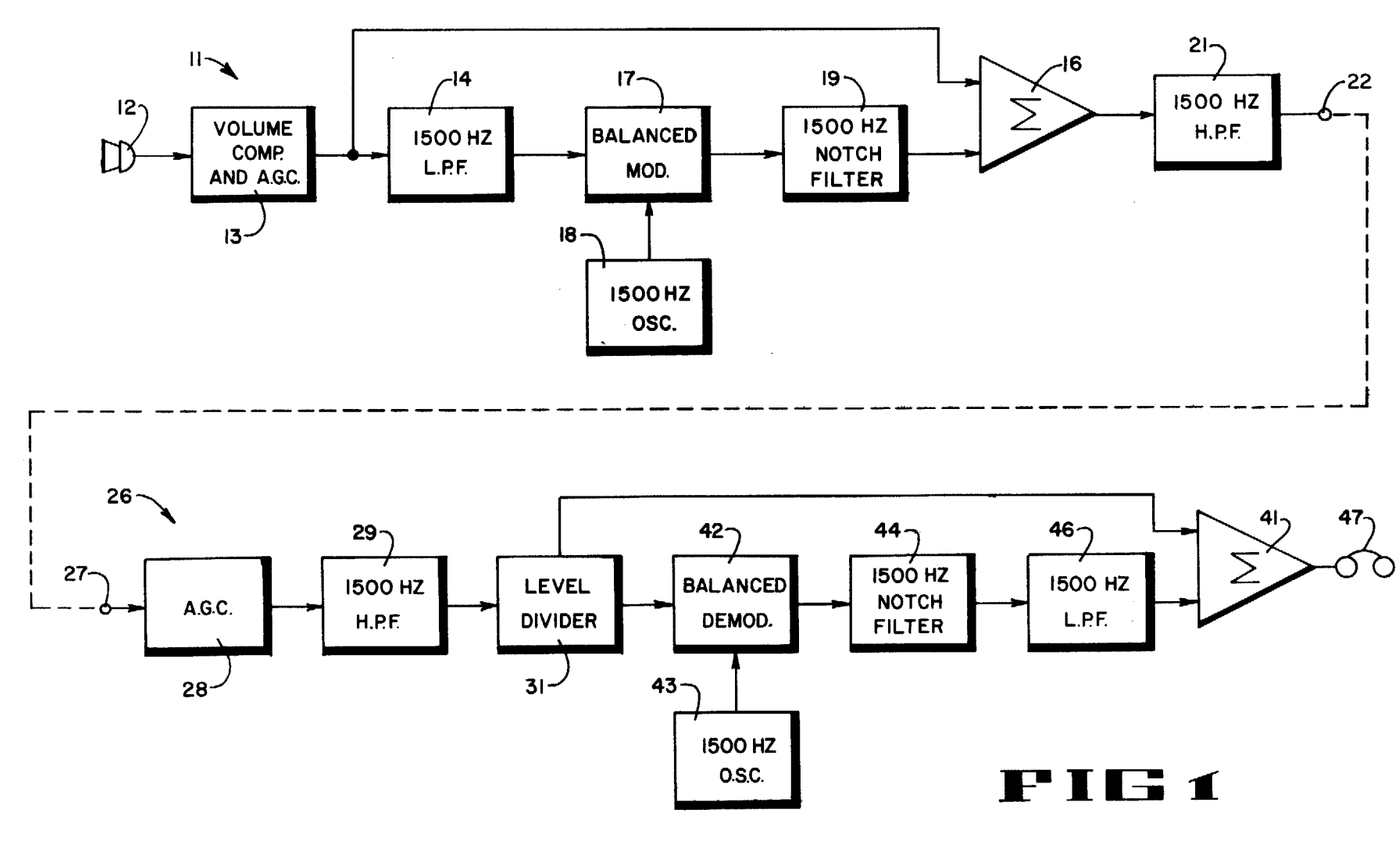
FIG. 1 is a block diagram of one embodiment of the system incorporating the invention.

The transmission system of FIG. 1 includes a converter 11 having an audio input device illustrated by way of example as a microphone 12 connected to the input of a volume compressor and automatic gain control circuit 13. The output of this circuit is connected to a 1500 Hz low pass filter 14 and to one input of a summation network 16. The output of the filter is connected to the input of a balanced modulator 17 which receives an injection signal from a 1500 Hz oscillator 18. The output of the balanced modulator is connected to the input of a 1500 Hz notch filter 19, and the output of this filter is connected to a second input of summation network 16. The output of the summation network is connected to the input of a 1500 Hz high pass filter 21, and the output of this filter is connected to an output terminal 22 for connection to transmission line, a modulation device, a voice scrambler, or other voice processing equipment.

Operation and use of the converter are as follows. After volume compression and processing by the A.G.C. circuit, the high and low frequency components of the signals from microphone 12 are applied to one input of summation network 16. The low frequency components also pass through filter 14 to balanced modulator 17. The modulator modulates the low frequency components onto the 1500 Hz oscillator signal, producing an upper side band and a lower side band, with the carrier suppressed. Any carrier present in the output of the modulator is removed by notch filter 19, and the upper and lower side band signals are combined with the high and low frequency components in summation network 16. The low frequency components and the lower side band are removed by filter 21, and the output signal delivered to output terminal 22 consists of only the high frequency components and the upper side band. In the preferred embodiment, the filters are active filters, and the gains of the filters are adjusted so that the upper side band is on the order of 12 to 15 db below the level of the high frequency components in the output signal.

The system of FIG. 1 also includes a deconverter 26 which has an input terminal 27 for receiving signals of the type produced by converter 11. The input terminal is connected to an automatic gain control circuit 28, and the output of this circuit is connected to the input of a 1500 Hz high pass filter 29. The output of this filter is connected to the input of a level divider 31.

Figures 2, 5:
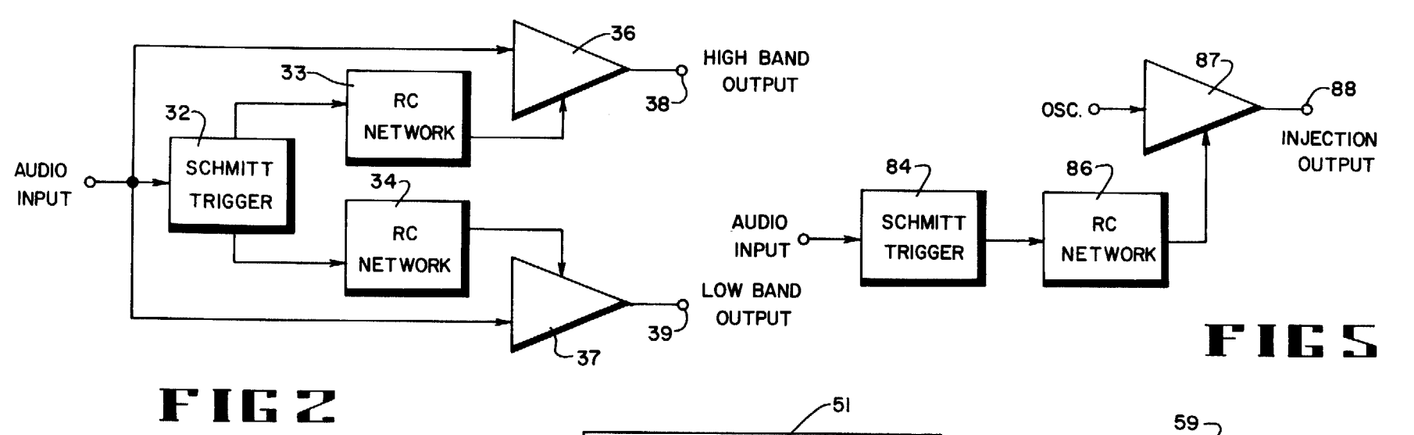
FIG. 2 is a detailed block diagram of the level divider of the embodiment of FIG. 1.
FIG. 5 is a detailed block diagram of the injection switch of the embodiment of FIG. 4.

As illustrated in FIG. 2, the level divider includes a Schmitt trigger 32, RC networks 33, 34 and controlled amplifiers 36, 37. The audio input signal is applied to the input of the Schmitt trigger and to the inputs of the amplifiers. The Schmitt trigger has two outputs connected, respectively, to the inputs of RC networks 33, 34, and the outputs of these networks are connected to the control inputs of amplifiers 36, 37. When the input signal rises to the level of the high frequency components, the Schmitt trigger delivers an enabling signal to amplifier 36 through RC network 33. When the level falls to the level of the low frequency components, the Schmitt trigger delivers an enabling signal to amplifier 37 through RC network 34. The time constants of the RC networks are chosen to provide a gradual turning on of the amplifiers in order to eliminate switching noise. In the preferred embodiment, the rise times of the networks are on the order of one to six cycles of the audio frequencies being switched. Thus, for the low frequency components of 200–1500 Hz, network 34 has a rise time on the order of five milliseconds, and for the high frequency components of 1500–3200 Hz, network 33 has a rise time on the order of 0.6 millisecond. The output of amplifier 36 is connected to a high frequency output terminal 38, and the output of amplifier 37 is connected to a low frequency output terminal 39.

The high frequency output terminal of level divider 31 is connected to one input of a summation network 41, and the low frequency output of the level divider is connected to the input of a balanced demodulator 42 which receives an injection input from an oscillator 43. The output of the demodulator is connected to the input of a 1500 Hz notch filter 44, and the output of this filter is connected to the input of a 1500 Hz low pass filter 46. The output of filter 46 is connected to a second input of summation network 41, and the output of this network is connected to headphones 47 or another suitable output device.

Operation and use of the deconverter of FIG. 1 are as follows. After the input signals pass through A.G.C. circuit 28 and filter 29, level divider 31 delivers the high level, high frequency components directly to summation network 41 and delivers the low level, upper side band to demodulator 42. In demodulating the side band, the demodulator restores the low frequency components to their original frequency range, and notch filter 44 removes any carrier which may be present. The low frequency components then pass through filter 46 to summation network 41 where they are recombined with the high frequency components and delivered to the headphones or other output device.

Figure 3:
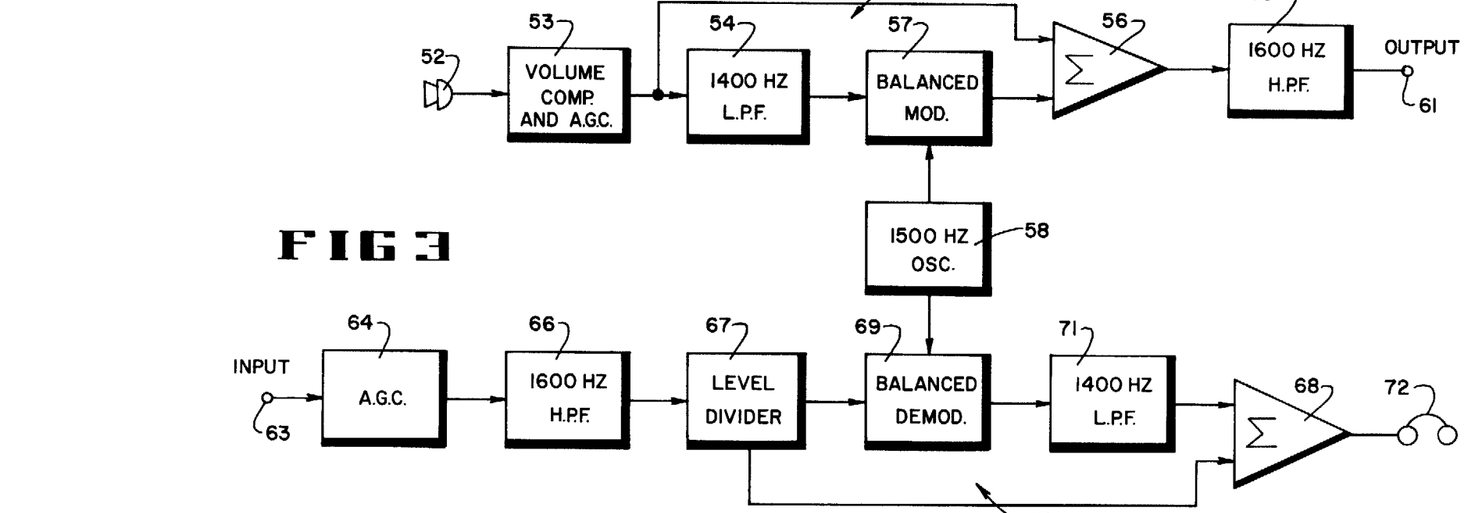
FIG. 3 is a block diagram of a second embodiment of a system incorporating the invention.

The system shown in FIG. 3 is generally similar to the system of FIG. 1 except the filter frequencies have been changed, the notch filters have been eliminated, and a common injection oscillator is utilized for the modulator and demodulator. The converter 51 of this system includes a microphone 52 and a volume compressor and A.G.C. circuit 53 which delivers outputs to a 1400 Hz low pass filter 54 and to one input of a summation network 56. The output of the low pass filter is connected to the input of a balanced modulator 57 which receives an injection signal from a 1500 Hz oscillator 58. The output of the modulator is connected to a second input of summation network 56, and the output of this network is connected to the input of a high pass filter 59. The output of this filter is connected to an output terminal 61. As in the system of FIG. 1, filters 54, 59 are active filters, and their gains are adjusted to make the upper side band on the order of 12–15 db below the level of the high frequency components in the output signal.

The deconverter 62 of FIG. 3 includes an input terminal 63, in A.G.C. circuit 64, a 1600 Hz high pass filter 66, and a level divider 67 of the type shown in FIG. 2. The high level, high frequency output of the level divider is connected to one input of a summation network 68, and the low level, low frequency output is connected to the input of a balanced demodulator 69. As indicated above, the demodulator receives an injection signal from oscillator 58, and the output of this circuit is connected to the input of a 1400 Hz low pass filter 71. The output of this filter is connected to a second input of summation network 68, and the output of this network is connected to headphones 72 or another suitable output device.

Operation and use of the system of FIG. 3 is similar to that described above in connection with FIG. 1.

Figure 4:
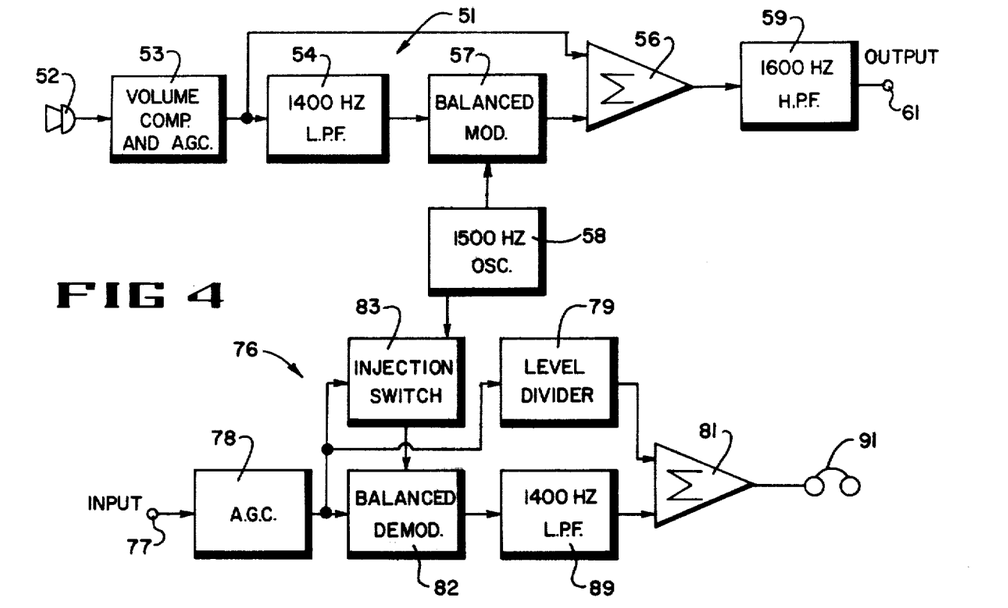
FIG. 4 is a block diagram of a third embodiment of a system incorporating the invention.

The system shown in FIG. 4 includes a converter which is identical to converter 51 of FIG. 3, and like reference numerals are utilized to designate corresponding elements in the two figures. The system of FIG. 4 also includes a deconverter 76 having an input terminal 77 connected to an A.G.C. circuit 78. The output of this circuit is connected to the input of a level divider 79 of the type illustrated in FIG. 2. The high level, high frequency output of the level divider is connected to one input of a summation amplifier 81. The low level, low frequency output of level divider 79 is not used. The output of A.G.C. circuit 78 is also connected to the input of a balanced demodulator 82 and to the input of an injection switch 83 which controls the application of injection signals from oscillator 58 to the demodulator.

As illustrated in FIG. 5, the injection switch includes a Schmitt trigger 84 to which the audio input signal is applied. The output of the Schmitt trigger is connected to the input of an RC delay network 86, and the output of this network is connected to the control input of a controlled amplifier 87. The oscillator input signal is applied to the input of the amplifier, and the output of the amplifier is connected to an output terminal 88. The Schmitt trigger monitors the level of the audio signal and delivers an output signal when the level falls to the low level of the side band signal to be demodulated. The network provides a gradual turning on of the amplifier and, in the preferred embodiment, has a rise time on the order of one to six cycles of the audio signal. For the 200–1600 Hz components of speech signals, the rise time of network 86 is preferably on the order of 5 milliseconds.

The output of demodulator 82 is connected to the input of a low pass filter 89, and the output of this filter is connected to a second input of summation network 81. The output of this network is connected to headphones 91 or another suitable output device.

Operation and use of the converter of the system shown in FIG. 4 is similar to that described above. In the deconverter, level divider 79 delivers the high level, high frequency components directly to summation amplifier 81. Injection switch 83 monitors the level of the input signals and applies the injection signal from oscillator 58 to demodulator 82 only when the low level side band signals are present. Thus, the demodulator restores the low frequency components to their original frequency range but has no effect on the high frequency components. The high frequency components and the demodulated low frequency components are recombined in summation amplifier 81 and delivered to the headphones or other output device.

Figure 6:
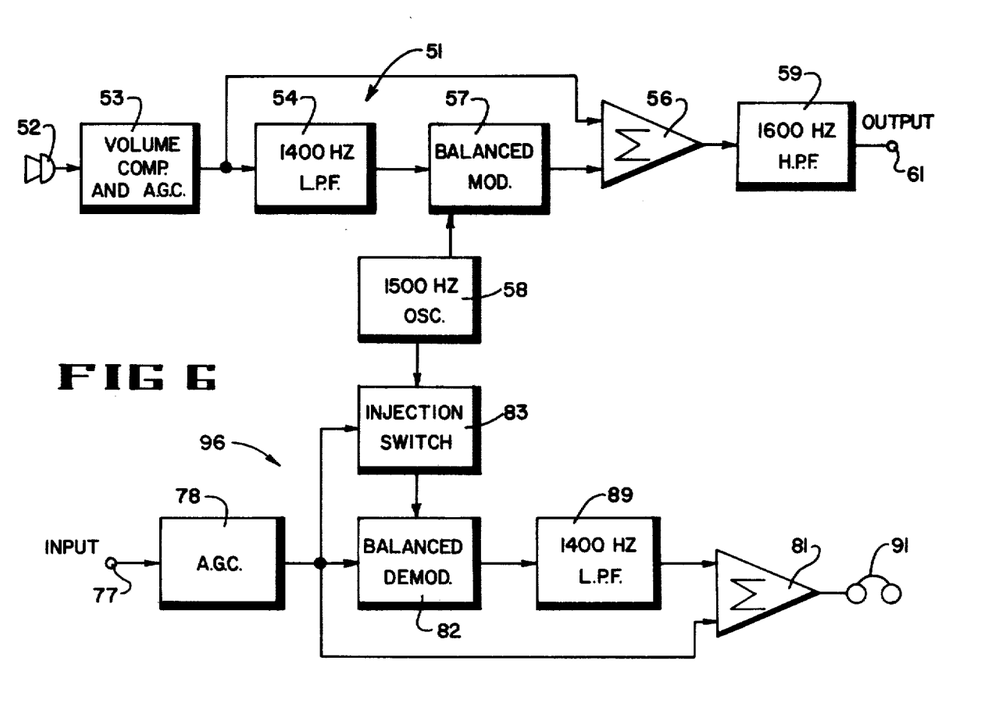
FIGS. 6–8 are block diagrams of additional embodiments of systems incorporating the invention.

The system shown in FIG. 6 is generally similar to the system of FIG. 4, and like reference numerals are utilized to designate corresponding elements in the two figures. The deconverter 96 of FIG. 6 differs from deconverter 76 in that level divider 79 is omitted and the output of A.G.C. circuit 78 is connected directly to the second input of summation amplifier 81. Consequently, the upper side band signals are delivered to the summation network along with the high frequency components and are present in the output signal. However, the side band signals are on the order of 12-15 db below the level of the high frequency components, and their presence is substantially imperceptible.

Figure 7:
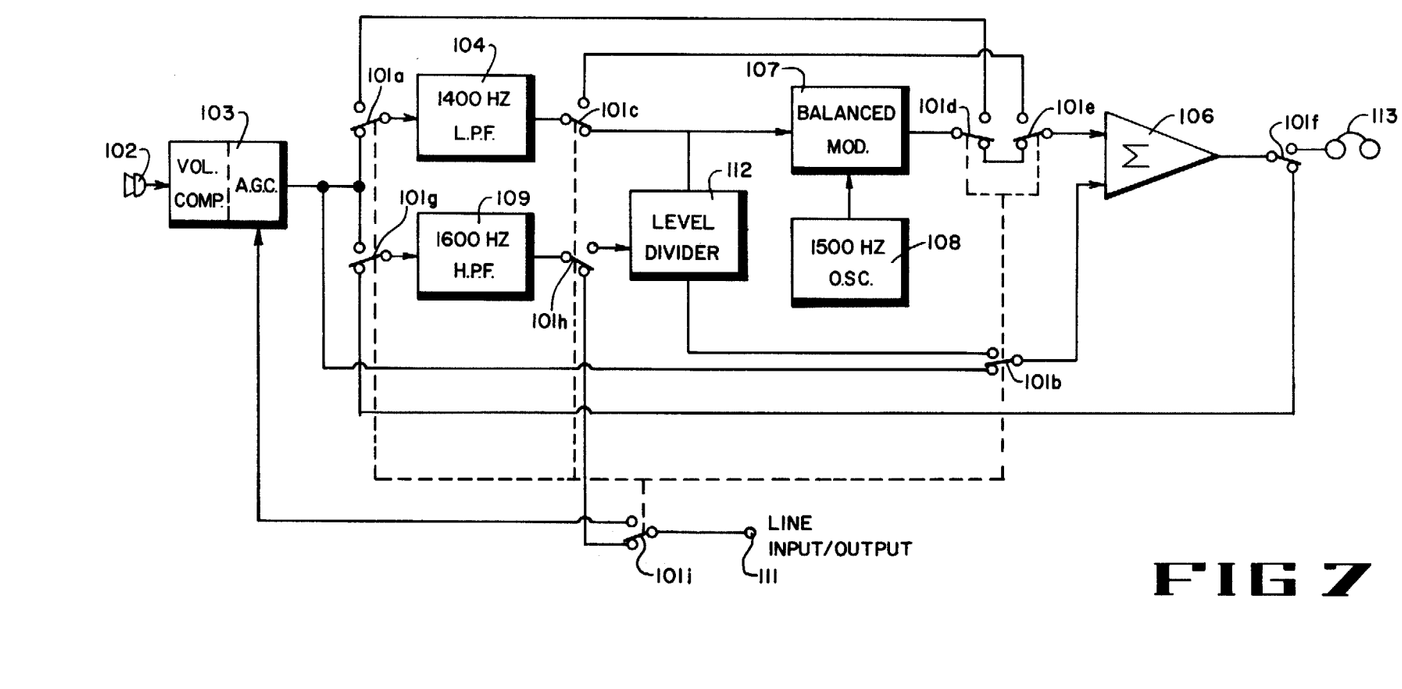

The embodiment shown in FIG. 7 is a push-to-talk system incorporating the basic circuit of FIG. 3 with a push-to-talk switch 101 for configuring the components alternatively for operation in TALK and LISTEN modes. In the TALK mode, the push-to-talk switch is in the position shown, and a microphone 102 is connected to the input of a volume compressor and A.G.C. circuit 103. The output of this circuit is connected to the input of a 1400 Hz low pass filter 104 by contacts 101a and to one input of a summing amplifier 106 by contacts 101b. The output of filter 104 is connected to the input of a balanced modulator 107 by contacts 101c, and the modulator receives an injection signal from a 1500 Hz oscillator 108. The output of the modulator is connected to a second input of summation amplifier 106 through contacts 101d, 101e. The output of the summation amplifier is connected to the input of a 1600 Hz high pass filter 109 by contacts 101f, 101g, and the output of this filter is connected through contacts 101h, 101i to a terminal 111 for delivery to an input/output line.

In the LISTEN mode, switch 101 is in the position opposite to that shown, and input/output terminal 111 is connected to the A.G.C. portion of circuit 103 by contacts 101i. The A.G.C. output is connected to the input of high pass filter 109 by contacts 101g, and the output of this filter is connected to the input of a level divider 112 by contacts 101h. The level divider is of the type illustrated in FIG. 2, and the low frequency output is connected to the input of modulator 107 while the high frequency output is connected to summation amplifier 106 by contacts 101b. The output of the modulator is connected to the input of low pass filter 104 by contacts 101d, 101a, and the output of this filter is connected to the second input of summation network 106 by contacts 101c, 101e. The output of the summation network is connected to headphones 113 by contacts 101f.

Operation and use of the embodiment of FIG. 7 is similar to that described above in connection with FIG. 3. Briefly, in the TALK mode, the high and low frequency components of speech signals pass directly to summation amplifier 106, and the low frequency components are translated to the high frequency range by modulator 107. The side band outputs of the modulator are combined with the high and low frequency components in the summation amplifier, and the lower side band and the untranslated low frequency components are removed by filter 109 before the output signal is delivered to terminal 111. The filters are active filters, and their gains are adjusted such that the upper side band is on the order of 12-15 db below the level of the high frequency components in the output signal.

In the LISTEN mode, the high frequency components and the upper side band signals are separated by level divider 112 and applied to the summation network and balanced modulator respectively. In this mode, the modulator demodulates the side band, restoring the low frequency components to their original frequency range. The high and low frequency components are recombined in the summation amplifier and delivered to headphones 113.

Figure 8:
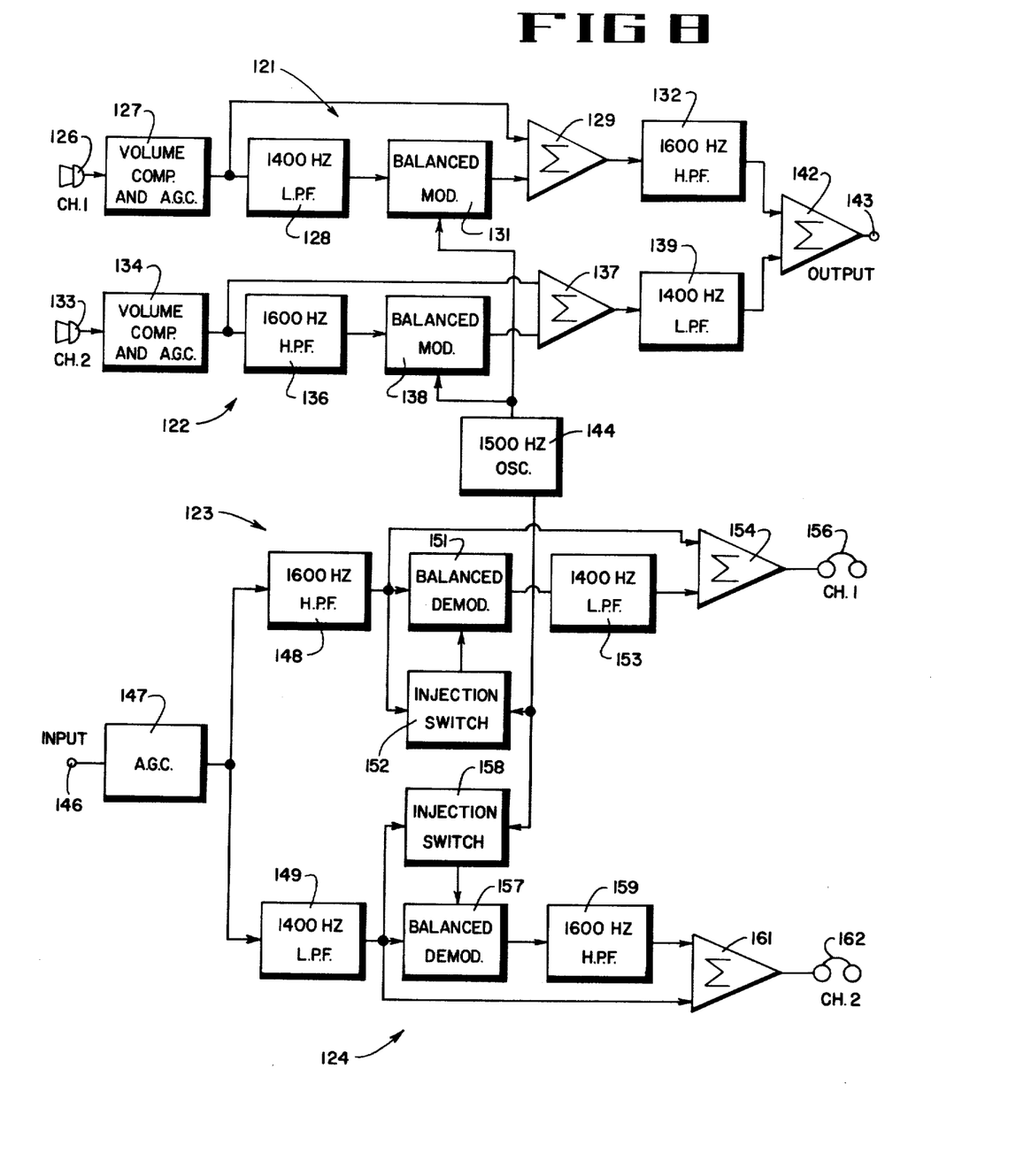

FIG. 8 illustrates a dual channel system for transmitting two speech signals in the bandwidth normally occupied by one. This system includes converters 121, 122 and deconverters 123, 124. Converter 121 is similar to converter 51 and serves to translate the low frequency components of speech signals from a microphone 126 to the high frequency band for transmission with the high frequency components in that band. This converter is similar to converter 51 and includes a volume compression and A.G.C. circuit 127, a 1400 Hz low pass filter 128, a summation network 129, a balanced modulator 131, and a 1600 Hz high pass output filter 132. The gains of filters 128, 132 are set to make the translated low frequency components in the output signal on the order of 12 to 15 db below the level of the high frequency components.

Converter 122 serves to convert the high frequency components of speech signals from a microphone 133 to the low frequency band for transmission in that band with the low frequency components. This converter includes a volume compression and A.G.C. circuit 134, a 1600 Hz high pass filter 136, a summation network 137, a balanced modulator 138, and a 1400 Hz low pass output filter 139. The gains of filters 136, 139 are set to make the translated high frequency components of the output signal on the order of 12-15 db below the level of the low frequency components. Injection signals for modulators 131, 138 are provided by a common 1500 Hz oscillator 144.

The outputs of filters 132, 139 are connected to the inputs of a summation amplifier 142, and the output of this amplifier is connected to an output terminal 143 for delivery to the transmission line or other voice processing circuitry.

Deconverters 123, 124 process the signals transmitted in the high and low frequency bands, respectively, and utilize a common input terminal 146 and a common A.G.C. circuit 147. At the output of the A.G.C. circuit, the incoming signals are separated and delivered to the respective deconverters by a 1600 Hz high pass filter 148 and a 1400 Hz low pass filter 149.

Deconverter 123 is similar to deconverter 96 and includes a balanced demodulator 151, an oscillator injection switch 152, a 1400 Hz low pass filter 153, a summation amplifier 154, and headphones 156. Injection switch 152 is of the type illustrated in FIG. 5 and serves to apply the oscillator injection signal to the demodulator only when the low level side band signal is present.

Deconverter 124 includes a balanced demodulator 157, an oscillator injection switch 158, a 1600 Hz high pass filter 159, a summation amplifier 161, and headphones 162. Injection switch 158 is of the type shown in FIG. 5 and serves to apply the injection signals to demodulator 157 only when the low energy side band signals containing the translated high frequency components are present.

Operation and use of the system of FIG. 8 can be summarized briefly. Converters 121, 122 compress the speech signals from microphones 126, 133 into the high and low portions of the frequency range. The compressed signals are combined by summation amplifier 142 and transmitted over a single line or channel. At the receiving station, the high and low frequency signals are separated by filters 148, 149 and processed by deconverters 123, 124, respectively.

The invention has a number of important features and advantages. It reduces the bandwidth required for conveying information by 50% and enables two complete signals to be transmitted in the bandwidth normally required for one. Switching noise is eliminated, and the converters and deconverters operate asynchronously. This results in an uncomplicated, efficient system for transmitting high quality voice signals in a reduced bandwidth. The method of the invention consists of the operation of the systems described above.

It is apparent from the foregoing that a new and improved system and method for transmitting signals in a reduced bandwidth have been provided. While only the presently preferred embodiments have been described, as will be apparent to those familiar with the art, certain changes and modifications can be made without departing from the scope of the invention as defined by the following claims.

What is claimed is:

1. In a method for transmitting signals having high and low frequency components which are displaced in time in such manner that only one of the components is present at a significant energy level at any instant of time, the steps of: continuously translating a first one of the components to the frequency range of the second component with no switching of the first component, combining the translated component with the first and second components with no switching of any of said components, and removing the first component from the combined signal to provide an output signal consisting substantially of the second component and the translated first component.

2. The method of claim 1 wherein the low frequency component is translated to the high frequency range and the levels of the components are adjusted in such manner that the translated low frequency component has a lower energy level than the high frequency component in the output signal.

3. The method of claim 1 wherein first and second input signals each having high and low frequency components are transmitted, the low frequency component of the first signal being translated and combined with the high frequency component of the first signal, together with the steps of translating the high frequency component of the second signal to the low frequency range, combining the translated high frequency component with the high and low frequency components of the second signal, and removing the high frequency component from the resulting signal to provide a second output signal consisting substantially of the low frequency component and the translated high frequency component of the second input signal.

4. The method of claim 1 further including the steps of separating the components in the output signal, restoring the first component to its original frequency range, and combining the restored first component with the second component.

5. In a system for transmitting signals having high and low frequency components which are displaced in time in such manner that only one of the components is present at a significant energy level at any instant of time: means for separating a first one of the components from the second component, means for continuously translating the first component to the frequency range of the second component with no switching of the first component, means for combining the translated component with the first and second components with no switching of any of said components, and filter means for removing the untranslated first component from the combined signal to provide an output signal consisting substantially of the second component and the translated first component, the components in the output signal being displaced in time and capable of separation at a receiving station.

6. The system of claim 5 wherein first and second input signals each having high and low frequency components are transmitted, the low frequency component of the first signal being transmitted and combined with the high frequency component of the first signal, together with means for separating the high frequency component from the low frequency component of the second signal, means for translating the high frequency component of the second signal to the low frequency range, means for combining the translated high frequency component with the high and low frequency components of the second signal, and second filter means for removing the high frequency component from the combined signal to provide a second output signal consisting substantially of the low frequency component and the translated high frequency component of the second input signal.

7. The system of claim 5 further including means for separating the components in the output signal, means for retranslating the first component to its original frequency range, and means for combining the retranslated first component with the second component.

8. In a method of transmitting signals having high and low frequency components which are displaced in time in such manner that only one of the components is present at a significant energy level at any instant of time, the steps of: continuously translating a first one of the components to the frequency range of the second component with no switching of said first component, combining the translated first component with the untranslated second component with no switching of either of said components to provide an output signal consisting substantially of the translated first component and the untranslated second component, said components occurring at different instants of time in the output signal, adjusting the levels of the components in such manner that the components have different energy levels in the output signal, applying the output signal continuously to the input of a demodulator, monitoring the level of the last named signal, applying an oscillator signal to the demodulator only when the signal applied to the demodulator is at the level of the first component to cause the demodulator to deliver an output signal consisting substantially of the first component retranslated to its original frequency range, and combining the retranslated first component with the second component.

9. The method of claim 8 wherein the low frequency component is translated to the high frequency range.

10. In a system for transmitting signals having high and low frequency components which are displaced in time in such manner that only one of the components is present at a significant energy level at any instant of time: means for continuously translating a first one of the components to the frequency range of the second component with no switching of the first component, means for combining the translated first component with the untranslated second component with no switching of either of said components to provide an output signal consisting substantially of the translated first component and the untranslated second component, the levels of the components being adjusted in such manner that the components have different energy levels in the output signal, demodulator means, means for continuously applying the output signal to the demodulator means, and injection signal source, means responsive to the level of the output signal for applying the injection signal to the demodulator means only when the signal is at the level of the first component, whereby the demodulator means delivers a signal in which the first component is restored to its original frequency range, and means for combining the restored first component with the second component.

11. The system of claim 10 wherein the low frequency component is translated to the high frequency range.

12. In a method of processing signals having high and low frequency components displaced in time and transmitted substantially within the bandwidth occupied by a first one of said components, the second one of said components being translated to the frequency range of the first component and being transmitted at a different level than the first component, the steps of: applying the signals to the input of a demodulator, monitoring the level of the signals, applying an oscillator signal to the demodulator only when the signals are at the level of the second component to cause the demodulator to deliver an output signal consisting substantially of the second component retranslated to its original frequency range, the oscillator signal being applied gradually and not reaching its full level for at least one cycle of the lowest frequency of the demodulated signal, and combining the retranslated second component with the first component.

13. In a system for processing signals having high and low frequency components displaced in time and transmitted substantially within the bandwidth occupied by a first one of said components, the second one of said components being translated to the frequency range of the first component and being transmitted at a different level than the first component: an injection signal source, demodulator means for combining the translated second component of the transmitted signals with the injection signal to restore the second component to its original frequency range, means for continuously applying the first and translated second components of the transmitted signals to the demodulator means, means responsive to the level of the transmitted signals for applying the injection signal to the demodulator means only when the signals are at the level of the second component, said means for applying the injection signal including a delay network for applying the signal gradually over at least one cycle of the lowest frequency in the output of the demodulator means, and means for combining the first component with the restored second component from the demodulator means.

14. In a method of transmitting voice signals having temporally separated vowel and consonant components, the vowel components falling primarily within a frequency range of 0–1500 Hz and the consonant components falling primarily in a frequency range of 1500–3000 Hz, the steps of: continuously translating a first one of the components to the frequency range of the second component with no switching of said first component, combining the translated first component with the untranslated second component with no switching of either of said components to provide an output signal consisting substantially of the translated first component and the untranslated second component, said components occurring at different instants of time in the output signal, and adjusting the levels of the components in such manner that the components have different energy levels in the output signal.

15. In a system for transmitting signals having temporally separated vowel and consonant components, the vowel components falling primarily within a frequency range of 0–1500 Hz and the consonant components falling primarily within a frequency range of 1500–3000 Hz: modulation means for translating a first one of the components to the frequency range of the second, filter means for selectively applying the first component to the modulation means without any switching of said first component, summation means for combining the translated first component from the modulation means with the untranslated first and second components, and additional filter means for removing the untranslated first component from the output of the summation means to provide an output signal consisting substantially of the translated first component and the untranslated second component, said components being separated in time in the output signal.

* * * * *